United States Patent
Unton et al.

(10) Patent No.: US 11,835,088 B2
(45) Date of Patent: Dec. 5, 2023

(54) THRUST BEARING FOR A ROTATING MACHINE

(71) Applicant: Rolls-Royce North American Technologies, Inc., Indianapolis, IN (US)

(72) Inventors: Timothy Unton, Noblesville, IN (US); Sean Andrew Morgan, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 219 days.

(21) Appl. No.: 17/303,435

(22) Filed: May 28, 2021

(65) Prior Publication Data

US 2022/0381182 A1 Dec. 1, 2022

(51) Int. Cl.
*F16C 25/08* (2006.01)
*F01D 25/16* (2006.01)
(Continued)

(52) U.S. Cl.
CPC ............ *F16C 25/086* (2013.01); *F01D 25/16* (2013.01); *F16C 19/16* (2013.01); *F16C 27/04* (2013.01);
(Continued)

(58) Field of Classification Search
CPC .... F16C 19/16; F16C 25/086; F16C 2360/23; F16C 27/04; F16C 32/0476; F16C 39/063;
(Continued)

(56) References Cited

U.S. PATENT DOCUMENTS

| 4,578,018 A | 3/1986 | Pope |
| 5,310,311 A | 5/1994 | Andres et al. |

(Continued)

FOREIGN PATENT DOCUMENTS

| EP | 0266991 A2 | 5/1988 |
| EP | 2236771 A2 | 10/2010 |

(Continued)

OTHER PUBLICATIONS

Machine Translation of WO-2013021047-A1 (Year: 2013).*

(Continued)

*Primary Examiner* — Alan B Waits
(74) *Attorney, Agent, or Firm* — Shumaker & Sieffert, P.A.

(57) ABSTRACT

A rotating machine including a thrust bearing configured to receive an axial thrust exerted by a rotor. The thrust bearing may be configured to transfer the axial thrust from the rotor to a housing or other structural component of the rotating machine using a plurality of ball bearings. The rotating machine includes a magnetic apparatus configured to cause the rotating machine to exert an axial force on the thrust bearing in the direction of the axial thrust of the rotor, such that the magnetic apparatus loads the ball bearings in the direction of the axial thrust. The magnetic apparatus may be configured to generate a magnetic field causing a first magnetic component of the magnetic apparatus to repel or attract a second magnetic component of the apparatus. The first magnetic component may be configured to rotate relative to the second magnetic component.

20 Claims, 7 Drawing Sheets

(51) Int. Cl.
*F16C 39/06* (2006.01)
*F16C 32/04* (2006.01)
*F16C 27/04* (2006.01)
*F16C 19/16* (2006.01)

(52) U.S. Cl.
CPC ........ *F16C 32/0476* (2013.01); *F16C 39/063* (2013.01); *F05D 2240/515* (2013.01); *F05D 2240/52* (2013.01); *F16C 2360/23* (2013.01)

(58) Field of Classification Search
CPC ....... F01D 25/16–164; F05D 2240/515; F05D 2240/52
See application file for complete search history.

(56) References Cited

U.S. PATENT DOCUMENTS

| | | | |
|---|---|---|---|
| 5,735,666 A * | 4/1998 | Johnston | F16C 39/06 |
| | | | 384/624 |
| 5,749,700 A | 5/1998 | Henry et al. | |
| 5,977,677 A | 11/1999 | Henry et al. | |
| 6,710,489 B1 | 3/2004 | Gabrys | |
| 6,917,130 B2 | 7/2005 | Aiello et al. | |
| 7,723,883 B2 | 5/2010 | Ozaki et al. | |
| 7,932,656 B2 | 4/2011 | Ozaki et al. | |
| 8,212,444 B2 | 7/2012 | Popov et al. | |
| 8,408,806 B2 | 4/2013 | Tecza | |
| 8,696,331 B2 | 4/2014 | Cunningham et al. | |
| 9,048,701 B2 | 6/2015 | Lang | |
| 9,157,447 B2 | 10/2015 | Freeman et al. | |
| 9,334,866 B2 | 5/2016 | Gilarranz | |
| 2011/0001379 A1 | 1/2011 | McCarthy et al. | |
| 2015/0229182 A1 | 8/2015 | Lang et al. | |
| 2017/0219009 A1 * | 8/2017 | Fletcher | F16C 25/08 |
| 2020/0072081 A1 * | 3/2020 | Gallet | F01D 25/16 |

FOREIGN PATENT DOCUMENTS

| | | | |
|---|---|---|---|
| WO | 03/079348 A1 | 9/2003 | |
| WO | 2008/032430 A1 | 3/2008 | |
| WO | WO-2013021047 A1 * | 2/2013 | ............ F16C 25/086 |
| WO | 2014/044761 A1 | 3/2014 | |
| WO | 2020/264171 A1 | 12/2020 | |

OTHER PUBLICATIONS

Wikipedia, "Slip Ring", Wikipedia, May 7, 2023, 3 pp., Retrieved from the Internet on Jul. 10, 2023 from URL: https://en.wikipedia.org/wiki/Slip_ring.

* cited by examiner

THRUST BEARING FOR A ROTATING MACHINE

TECHNICAL FIELD

The present disclosure relates to a thrust bearing, such as a thrust bearing of a rotating machine.

BACKGROUND

Thrust bearings may be used to support axial and/or radial loads generated by a rotating machine. The thrust bearings may be used to hold the axial position of a rotor within the rotating machine as the rotor rotates about a rotor axis. The thrust bearings may be configured to receive an axial thrust from the rotating rotor and transmit the axial thrust to a stationary portion of the rotating machine, such as a housing mechanically supporting the rotor. In some cases, the thrust bearing may be configured to transfer the axial thrust to the housing through a plurality of ball bearings configured to orbit a rotor shaft as the rotor rotates.

SUMMARY

The present disclosure describes a rotating machine that includes a rotor configured to exert an axial thrust on a thrust bearing. The rotor may be configured to exert the axial thrust on the thrust bearing in a specific direction when the rotor rotates in a mechanical direction of rotation to support an operation of the rotating machine. For example, the rotor may be configured to rotate in a mechanical direction of rotation of cause an intake air flow in a first direction to support operation of the rotating machine, such that the rotor exerts an axial thrust in a second direction opposite the first direction on the thrust bearing. The rotor may be configured such that the axial thrust varies as a loading on the rotor varies. The rotating machine disclosed herein includes a magnetic apparatus configured to cause the rotor to exert an axial force on the thrust bearing in the direction of the axial thrust as the axial thrust varies, such that ball bearings of the thrust bearing remain loaded in the direction of the axial thrust over the operating conditions of the rotor.

In examples, a rotating machine comprises: a rotor configured to rotate relative to a structural component of the rotating machine; a thrust bearing comprising a first race, a second race, and a plurality of ball bearings, wherein: the first race is configured to receive an axial thrust from the rotor when the rotor rotates relative to the structural component, and the plurality of ball bearings are configured to transfer the axial thrust to the second race; and a magnetic component affixed to the rotating machine, wherein the magnetic component is configured to generate a magnetic field causing the first race to exert an axial force on the ball bearings in the direction of the axial thrust.

In examples, a rotating machine comprises: a rotor configured to rotate relative to a structural component of the rotating machine; a thrust bearing comprising a first race configured to rotate synchronously with the rotor, a second race, and a plurality of ball bearings, wherein: the first race is configured to receive an axial thrust from the rotor when the rotor rotates relative to the structural component, and the plurality of ball bearings are configured to transfer the axial thrust to the second race; and a magnetic component affixed to the rotating machine, wherein: the magnetic component is configured to generate a magnetic field to exert a mechanical force on the structural component, and the structural component is configured to transmit a portion of the mechanical force to cause the first race to exert an axial force on the ball bearings in the direction of the axial thrust.

In examples, a method comprises: generating a magnetic field using a magnetic component affixed to a rotating machine having a thrust bearing comprising to a first race, a second race, and a plurality of ball bearings between the first race and the second race, wherein, when the rotor rotates relative to a structural component of the rotating machine, the rotor exerts an axial thrust on the first race and the plurality of ball bearings transfer the axial thrust to the second race; and causing, using the magnetic field, the first race to exert an axial force on the ball bearings in the direction of an axial thrust.

The details of one or more examples are set forth in the accompanying drawings and the description below. Other features, objects, and advantages will be apparent from the description and drawings, and from the claims.

DETAILED DESCRIPTION

Figure 1:
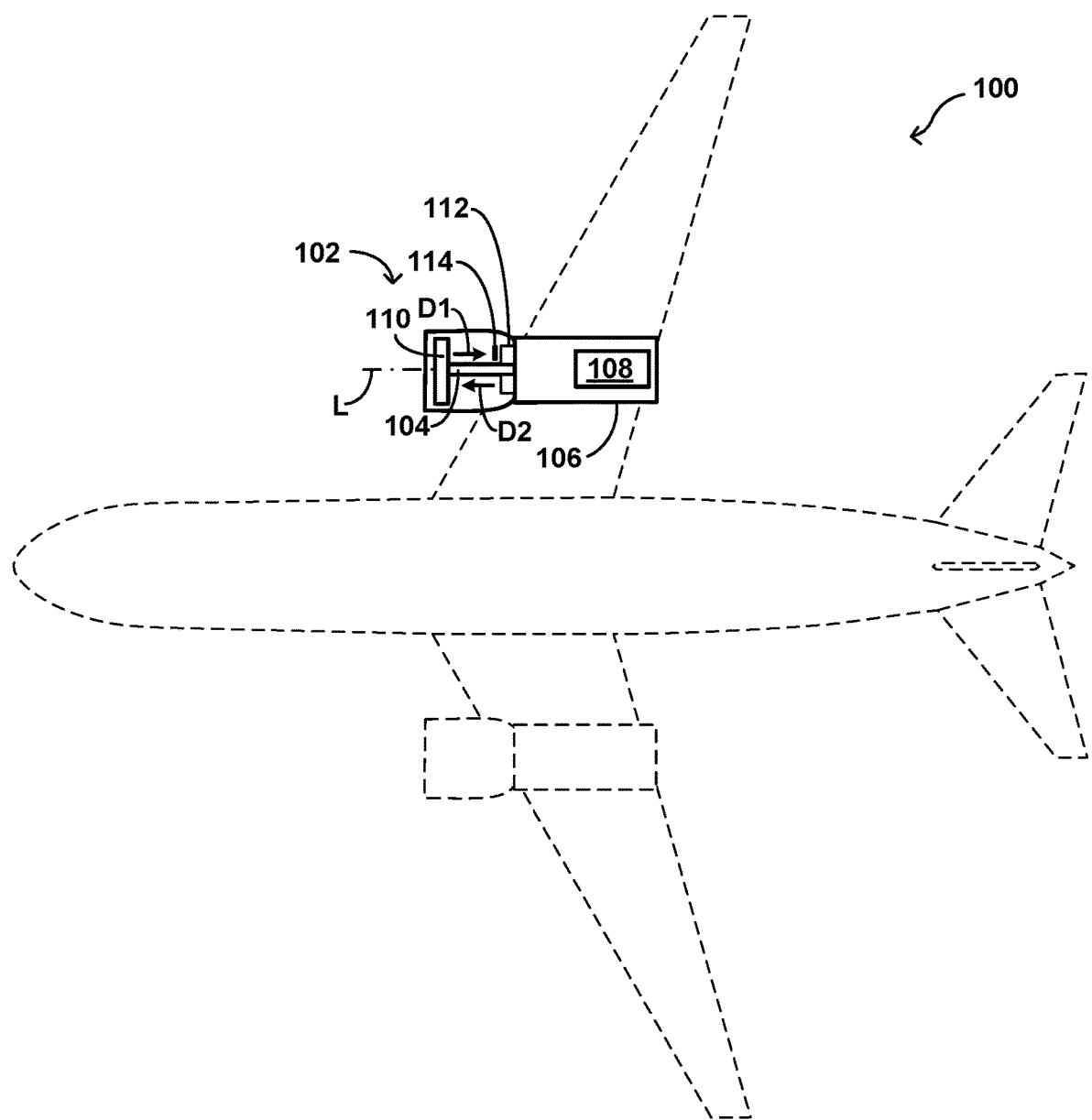
FIG. 1 is a schematic illustration of an example rotating machine on a vehicle.

Thrust bearings are commonly used to support axial and/or radial loads generated by rotating machinery. The thrust bearings may be used to hold the axial position of a rotor within the rotating machine as the rotor rotates about a rotor axis. Typically, the thrust bearings are configured to receive an axial thrust from the rotating rotor and transmit the axial thrust to a stationary portion of the rotating machine, such as a housing mechanically supporting the rotor.

The rotor may be configured to generate the axial thrust as a product of typical rotor operation. For example, a fan (e.g., a turbofan) may be configured to rotate around a rotational axis to cause an air flow through a fan impellor. The fan impellor may be supported by a fan shaft generally situated along the rotational axis, such that as the fan impellor causes the air flow, the fan shaft experiences an axial thrust along the rotational axis and in a direction opposite the direction of the air flow through the impellor. In another example, a turbine rotor (e.g., a gas turbine) driven to rotate by a gas flow may experience an axial thrust caused by working gas exerting an axial force on the turbine blades as the gas drives the rotation. Thrust bearings may be utilized to receive the axial thrust from the rotating shaft and transmit the axial thrust to another portion of the rotating machine (e.g., a housing), such that the thrust bearing generates an oppositely oriented reaction force to substantially maintain the axial position of the rotor.

Typically, a magnitude of the axial thrust generated by the rotating machine is dependent on the operating status of the rotating machine. For example, a fan operating to produce a higher air flow through the fan impellor might produce a higher axial thrust than when the fan operates to produce a lower air flow. A turbine receiving a greater gas flow might produce a higher axial thrust than when the turbine receives a reduced gas flow. Further, the rotating machine may include a variety of components which contribute individual forces to the axial thrust, such that the axial thrust becomes a net force arising from the sum of the individual forces. Depending on the operating condition of the rotating machine, this may produce an axial thrust which occurs in a generally forward direction of the rotating machine under one operating condition and in a generally aft direction of the rotating machine under a different operating condition. This substantial reversal of the axial thrust reverses the axial load on the thrust bearing, generating a cross-over condition on the thrust bearing. Hence, the axial load on a thrust bearing may vary in both magnitude and direction based on the operating condition of the rotating machine.

The cross-overs and lower axial loads may cause premature wear of the thrust bearing and the potential for bearing failure, as well as cause undesired vibrations of the rotating machine. For example, the thrust bearing may include a plurality of ball bearings between an inner race and an outer race, with the inner race and outer race configured to rotate substantially independently around the rotational axis of the rotating machine. The inner race may be configured to, for example, rotate substantially synchronously with the rotor shaft of the rotating machine as the outer race remains rotationally stationary with respect to a housing of the rotating machine. With reduced or no axial load, or loads approaching cross-over, the ball bearings may centrifuge onto the outer race and begin to orbit substantially at the speed of the outer race, generating a condition known as slip. When the axial load subsequently increases on the thrust bearing, the differential in speed between the ball bearings and the inner race may cause the ball bearings to skid in an axial and/or rotational direction, potentially damaging the ball bearings, the outer race, and/or the inner race. This may lead to degradation of the thrust bearing.

The disclosure herein includes a magnetic apparatus configured to generate an axial force on a thrust bearing of a rotating machine in the direction of an axial thrust generated by a rotor. The direction of the axial force may be the direction of the axial thrust exerted by the rotor on the thrust bearing when the rotor rotates in a mechanical direction of rotation during operation. The mechanical direction of rotation may be a specific rotational direction (e.g., clockwise or counter-clockwise) around a rotational axis that the rotating machine is configured to exhibit. Hence, the magnetic apparatus may be configured to exert an axial force on the thrust bearing in the direction of the axial thrust exerted by the rotating machine when the rotating machine rotates in the mechanical direction of rotation, such that thrust bearing experiences at least some amount of axial force in the direction of the axial thrust over the various operating conditions of the rotor. Exerting the axial force in the direction of the axial thrust of the rotor may mitigate and/or even eliminate reduced or cross-over thrust bearing loads on the thrust bearing.

In examples, the mechanical direction of rotation is a specific rotational direction the rotor of the rotating machine is configured to exhibit to generate a desired output within a system including the rotating machine. For example, a fan may be configured to rotate in a mechanical direction of rotation (e.g., clockwise or counter-clockwise) to provide an air flow in a particular desired direction across a fan impellor (e.g., to provide intake air to a turbine). A turbine rotor may be configured to rotate in a mechanical direction of rotation (e.g., clockwise or counter-clockwise) to provide rotary motion in a particular desired rotary direction (e.g., to cause a compressor to compress a gas and/or a generator to generate electrical power) when the turbine receives a pressurized gas. The magnetic apparatus of this disclosure may be configured to exert an axial force on the thrust bearing in the direction of the axial thrust exerted by the rotor on the thrust bearing when the rotor rotates in the mechanical direction of rotation. In examples, the rotor is configured to rotate relative to a structural component of the rotary machine (e.g., a housing), and the thrust bearing is configured to receive the axial thrust from the rotor and transmit the axial thrust to the structural component.

The thrust bearing may include a first race (e.g., a lower race), a second race (e.g., an upper race), and a plurality of ball bearings configured to position between the first race and the second race. The first race may be configured to receive the axial thrust from the rotor. In examples, the first race is configured to receive the axial thrust from the while rotating substantially synchronously with the rotor. For example, the first race may include a structure affixed to and extending over some portion of or substantially all of a circumference defined by the rotor. The second race may be mechanically supported by and configured to remain substantially stationary with some structural component, such as a housing of the rotating machine, such that the first race rotates (e.g., with the rotor) relative to the second race. The plurality of ball bearings ("ball bearings") are configured to transmit the axial thrust received by the first race from the first race to the second race, such that the thrust bearing may transfer the axial thrust from the rotor to the structural component supporting the second race. Hence, the first race is configured to impart a force on the ball bearings in the direction of the axial thrust to cause a transfer of the axial thrust to the second race.

The ball bearings may be configured to substantially orbit the first race while transferring the axial thrust from the first race to the second race. In examples, the thrust bearing is configured such that when the ball bearings transmit the axial thrust to the second race, and the second race transmits the axial thrust to the structural component, the second race exerts a reaction force opposite the axial thrust on the ball bearings. At sufficiently high axial thrust loadings, the force exerted by the first race and the oppositely oriented reaction force exerted by the second race tend to cause the ball bearings to maintain a tractive force on both the first race and the second race, substantially limiting and/or avoiding slippage of the ball bearings between the first and second race.

The magnetic apparatus of this disclosure is configured to generate a magnetic field causing the first race to exert an axial force on the ball bearings in the direction of the axial thrust when the ball bearings are positioned between the first race and the second race. The magnetic device may be configured to generate the magnetic field to cause the first race to exert a first axial force in the direction of the axial thrust on the ball bearings and cause the second race to exert a second axial force opposite the first axial force on the ball bearings. The magnetic apparatus may be configured to cause first race to exert the first axial force and the second race to exert the second axial force as the axial thrust generated by the rotor varies with loading, such that at reduced or substantially unloaded conditions of the rotor, the resultant tractive force on the ball bearings generated by the magnetic apparatus tends to limit and/or avoid slippage of the ball bearings between the first and second race. Thus, the magnetic apparatus may be configured to substantially "preload" the ball bearings, such that the first race exerts an axial force on the ball bearings in the direction of the axial thrust even during reduced or no-load conditions of the rotor.

The magnetic apparatus may be configured to cause a force on the rotating machine using the magnetic field in any manner sufficient to cause the first race to exert an axial force on the ball bearing in the direction of the axial thrust (e.g., a first axial thrust). In some examples, the magnetic apparatus is configured to cause a force on the rotor and/or first race in the direction of the axial thrust, such that the first race exerts the first axial force on the ball bearings, the ball bearings transmit the first axial force to the second race, and second race responds to the first axial force by exerting a second axial force (e.g., a reaction force) on the ball bearings in a direction opposite the first axial force. In other examples, the magnetic apparatus is configured to cause a force on a structural component and/or the second race in a direction opposite the direction of the axial thrust (e.g., a second axial thrust), such that the second race exerts the second axial force on the ball bearings, the ball bearings transmit the second axial force to the first race, and first race responds to the second axial force by exerting the first axial force (e.g., a reaction force) on the ball bearings in the direction of the axial thrust. Hence, the magnetic apparatus may be configured to cause the first race to exert the axial force on the ball bearings in the direction of the axial thrust by generating a magnetic field to exert a force on the rotor and/or first race, or by generating a magnetic field to exert a force on the structural component and/or second race.

The magnetic apparatus includes a magnet affixed to the rotary machine and configured to generate a magnetic field to cause the first race to exert the axial force on the ball bearings in the direction of the axial thrust. In some examples, the magnet is affixed to the rotor and/or a rotating component (e.g. A fan impellor) configured to rotate synchronously with the rotor, such that the magnet itself rotates synchronously with the rotor. In other examples, the rotor is configured to rotate relative to a structural component of the rotating machine, and the magnet is affixed to the structural component. The magnet may be any type of magnet configured to generate the magnetic field, such as a permanent magnet and/or an electromagnet.

In some examples, the magnet is configured to cause the first race to exert the axial force on the ball bearings by attracting or repelling the structural component relative to the rotor and/or rotating component of the rotating machine. For example, the magnet may be mechanically supported by the rotor and/or rotating component and configured such that the magnetic field interacts with the structural component to generate a magnetic force tending to attract or repel the structural component. In some examples, the magnet is configured to cause the first race to exert the axial force on the ball bearings by attracting or repelling the rotor and/or rotating component relative to the structural component. For example, the magnet may be mechanically supported by the structural component and configured such that the magnetic field interacts with the rotor and/or rotating component to generate a magnetic force tending to attract or repel the rotor and/or rotating component.

The magnet may be configured such that the magnetic force on the rotor, rotating component, and/or structural component is substantially independent of a position and/or rotational speed of the rotor, such that the magnetic force causes the first race to exert the axial force on the ball bearings substantially independently of the operating condition (e.g., the loading) on the rotor. The magnetic apparatus may be configured to cause the first race to continue to exert the axial force on the ball bearings in the direction of the axial thrust of the rotor as the axial thrust varies, such that the magnetic apparatus may act to mitigate the impact of a varying net axial force experienced by the thrust bearing as the forces exerted by the rotor, the housing, or other portions of the rotating machine vary during operations of the rotating machine. In examples, the magnet is a ring magnet or one of a plurality of magnets surrounding a rotational axis of the rotor and configured to exert the magnetic force on the rotor, rotating component, and/or structural component substantially symmetrically around the rotational axis.

Hence, the magnetic apparatus is configured to generate a magnetic field to cause a first race of a thrust bearing to exert an axial force on ball bearings of the thrust bearing in a direction of an axial thrust or a rotor of a rotating machine. The magnetic apparatus may be configured to substantially maintain the axial force over reduced or substantially unloaded conditions of the rotor, such that the axial force exerted by the first race tends to limit and/or avoid slippage of the ball bearings between the first race and a second race. The magnetic apparatus may be configured to substantially "pre-load" the ball bearings, such that the first race exerts an axial force on the ball bearings in the direction of the axial thrust even during reduced or no-load conditions of the rotor.

FIG. 1 is a conceptual diagram of a vehicle 100 that includes a rotating machine 102, in accordance with one or more techniques of this disclosure. In some examples, vehicle 100 is an aircraft. In other examples, vehicle 100 may include any type of vehicle utilizing a rotating machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous. Although represented in FIG. 1 within vehicle 100 for illustration, in other examples, rotating machine 102 may be supported within any type of platform or structure, including terrestrial platforms and/or structures (e.g., buildings) configured to remain stationary.

Rotating machine 102 includes a rotor 104 mechanically supported by a housing 106 of rotating machine 102. Rotor 104 is configured to rotate relative to housing 106 around a rotational axis L. Rotor 104 is configured to rotate around rotational axis L to support an operation of rotating machine 102. For example, rotating machine 102 may be a turbine of vehicle 100 including a combustion section 108 configured to receive an intake air flow from a fan impellor 110 mechanically supported by rotor 104. Rotor 104 may be configured to rotate to cause fan impellor 110 to generate the intake air flow in a direction from fan impellor 110 toward combustion section 108 (e.g., in the direction D1). In examples, rotor 104 is configured to rotate around rotational axis L in a specific mechanical direction of rotation (e.g., clockwise or counter-clockwise) to support the operation of rotating machine 102. For example, rotating machine 102 may be configured to generate a thrust on vehicle 100 when combustion section 108 receives an intake air flow in the direction D1, and rotor 104 may be configured to cause fan impellor 110 to generate the intake air flow in the direction D1 when rotor 104 rotates in its mechanical direction of rotation.

Fan impellor 110 may experience a thrust in the direction D2 as rotor 104 causes fan impellor 110 generate the intake air flow in the direction D1. The thrust experienced by fan impellor 110 in the direction D2 may vary with a flow magnitude (e.g., a mass flow and/or velocity) of the intake air flow in the direction D1 generated by fan impellor 110. Rotor 104 mechanically supports fan impellor 110, such that fan impellor 110 may transmit the thrust in the direction D2 to rotor 104. Hence, as rotor 104 rotates to cause fan impellor 110 to generate the intake air flow in the direction D1, rotor 104 experiences an axial thrust in the direction D2. As fan impellor 110 is operated to vary the flow magnitude of the intake air flow produced, this varies the loading on and axial thrust experienced by rotor 104.

Rotating machine 102 includes a thrust bearing 112 configured to transmit the axial thrust from rotor 104 to housing 106. Rotor 104 may be configured to exert the axial thrust on thrust bearing 112 in a specific direction (e.g., the direction D1) when rotor 104 rotates (e.g., when rotor 104 rotates in a specific mechanical direction of rotation). However, generally speaking, thrust bearing 112 may be subject to additional forces exerted by housing 106, other portions of rotating machine 102, and/or vehicle 100. Hence, the net axial force on thrust bearing 112 may substantially be a vector summation of the axial thrust imparted by rotor 104 and the additional forces exerted by housing 106, other portions of rotating machine 102, and/or vehicle 100. This may cause the net axial force on thrust bearing 112 to vary as the axial thrust imparted by rotor 104 and/or the magnitude of the additional forces vary. Consequently, the net axial force on thrust bearing 112 may be in the direction of the axial thrust generated by rotor 104 (e.g., the direction D1) under some operating conditions of rotor 104, and in a direction substantially opposite the direction of the axial generated by rotor 104 (e.g., the direction D2) under other operating conditions of rotor 104.

In examples wherein thrust bearing 112 includes a first race configured to receive the axial thrust from rotor 104 and a plurality of ball bearings configured to transmit the axial thrust to a second race, this variation the net axial force may reduce or reverse the load on thrust bearing 112, causing the ball bearings to centrifuge to the second race and orbit substantially at the speed of the second race. When the first race and the second race are configured to rotate at different speeds, the differential in speed between the ball bearings and the inner race may cause the ball bearings to skid in an axial and/or rotational direction when the axial thrust from rotor 104 subsequently increases (e.g., when the load is increased on rotor 104). For example, when the first race is configured to rotate substantially synchronously with rotor 104 as the second race remains rotationally stationary with respect to housing 106, the subsequently increased loading of rotor 104 may cause the ball bearings to skid and potentially damage the ball bearings, the outer race, and/or the inner race. This may lead to degradation of the thrust bearing.

Rotating machine 102 includes a magnetic apparatus 114 configured to exert a axial force on thrust bearing 112 in the same direction as that produced when rotor 104 exerts the axial thrust on thrust bearing 112. For example, when rotor 104 is configured to exert an axial thrust in the direction D2 on thrust bearing 112 when rotor 104 rotates, magnetic apparatus 114 may be configured to exert an axial force on thrust bearing 112 in the direction D2. Hence, magnetic apparatus 114 may be configured to exert an axial force on thrust bearing 112 tending to load thrust bearing 112 in the same direction as that experienced when rotor 104 exerts an axial thrust on thrust bearing 112. The axial force exerted by magnetic apparatus 114 may act to mitigate the impact of a varying net axial force experienced by thrust bearing 112 as the forces exerted by rotor 104, housing 106 or other portions of rotating machine 102, and/or vehicle 100 vary during operations of rotating machine 102.

Figure 2:
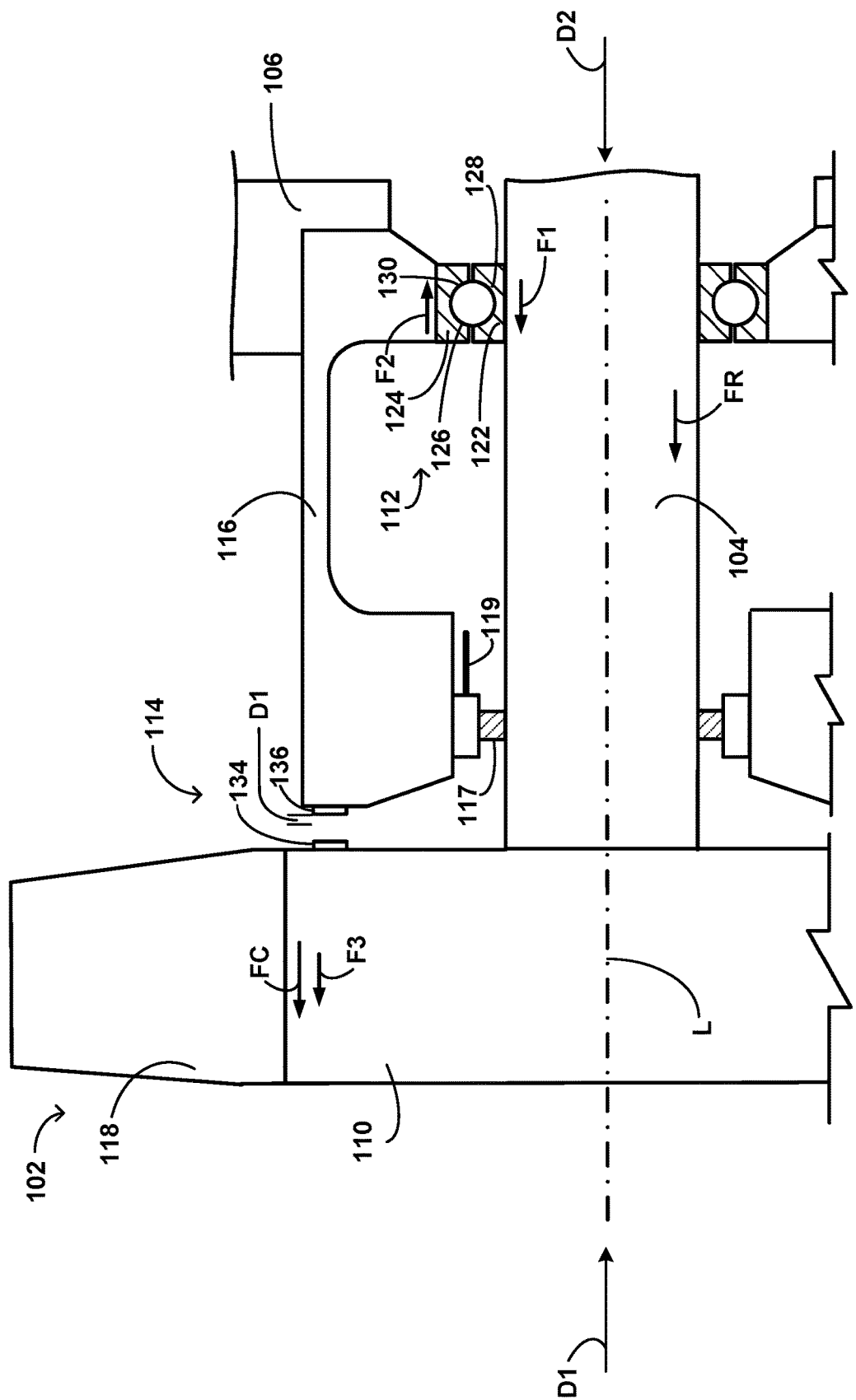
FIG. 2 is a schematic illustration of an example rotating machine with a magnetic apparatus supported by a rotating component.

FIG. 2 illustrates an example rotating machine 102 including a rotor 104, thrust bearing 112, and magnetic apparatus 114. Rotor 104 is configured to rotate relative to a structural component 116 and/or housing 106 of rotating machine 102. Rotor 104 is configured to exert an axial thrust FR on thrust bearing 112 when rotor 104 rotates (e.g., rotates in a mechanical direction of rotation). Rotor 104 may be configured to exert the axial thrust FR on thrust bearing 112 in a specific direction when rotor 104 rotates, such as the direction D2. Thrust bearing 112 is configured to receive the axial thrust FR and transmit the axial thrust FR to structural component 116 and/or housing 106. Thrust bearing 112 may be configured such that other components of rotating machine 102 (e.g., structural component 116 and/or housing 106) exert additional forces on thrust bearing 112. These additional forces may act on thrust bearing 112 in the same direction as the axial thrust FR or in a different direction from the axial thrust FR, such that a net force on thrust bearing 112 may be dependent on the axial thrust FR from rotor 104 and the additional forces exerted by the other components of rotating machine 102. In examples, rotating machine 102 includes a rotational bearing 117 configured to allow rotor 104 to rotate around rotational axis L relative to structural component 116 and/or housing 106. Rotating machine 102 may include a conduit 119 configured to deliver a lubricating oil to rotational bearing 117.

The axial thrust FR produced by rotor 104 may vary based on, for example, the loading placed on rotor 104. The additional forces exerted on thrust bearing 132 by other components of rotating machine 102 may vary based on an operating condition of rotating machine 102. Hence, the loading of thrust bearing 112 may vary as the load on rotor 104 varies, the forces exerted on thrust bearing 112 by other components of rotating machine 102 vary, or for other reasons.

Rotating machine 102 further includes a magnetic apparatus 114 configured to cause rotating machine 102 (e.g., rotor 104, structural component 116, and/or housing 106) to exert loading of thrust bearing 112 in the direction of the axial thrust FR. That is, magnetic apparatus 114 is configured to load thrust bearing 112 in substantially the same direction as the loading exerted by rotor 104 when rotor 104 rotates in its mechanical direction of rotation and exerts the axial thrust FR on thrust bearing 112. Magnetic apparatus 114 is configured to generate a magnetic field which interacts with rotor 104 and/or another portion of rotating machine 102. Magnetic apparatus 114 may be configured such that the magnetic field produces a repelling or attracting magnetic force causing rotating machine 102 to exert a force on thrust bearing 112 in the direction of the axial thrust FR exerted by rotor 104. Hence, magnetic apparatus 114 may be configured to substantially maintain a loading on thrust bearing 112 in the direction of the axial thrust FR as the loading on rotor 104 and/or the additional forces exerted on thrust bearing 112 vary over the operating conditions of rotating machine 102. In examples, thrust bearing 112 includes a first race 122, a second race 124, and a plurality of ball bearings 126 ("ball bearings 126"). Magnetic apparatus 114 may be configured to exert a loading on thrust bearing 112 in the direction of the axial thrust FR such that ball bearings 126 maintain a tractive force with first race 122 and second race 124 as the loading on rotor 104 varies. The loading on thrust bearing 112 in the direction of the axial thrust FR exerted by magnetic apparatus 114 may thus reduce and/or eliminate a tendency of ball bearings 126 to slip and/or skid as the operating conditions of rotating machine 102 vary.

In examples, rotor 104 is configured to rotate around rotational axis L. Rotor 104 may be configured such that when rotor 104 rotates, rotor 104 produces and/or experiences an axial thrust FR in a specific direction substantially parallel to rotational axis L, such as the direction D2. Rotor 104 may be configured to produce the axial thrust FR when rotor 104 rotates in a specific mechanical direction of rotation (e.g., clockwise or counter-clockwise around rotational axis L). In examples, rotor 104 is configured to mechanically support a rotating component 118 (e.g., a fan impellor) configured to cause the axial thrust FR on rotor 104 when rotor 104 causes a rotation of the rotating component. Although illustrated in the direction D2 in the example of FIG. 1, rotor 104 may experience the axial thrust FR in the direction D2 or another direction in other examples.

First race 122 of thrust bearing 112 may be configured to receive the axial thrust FR from rotor 104 (e.g., in the direction D2) when rotor 104 rotates around rotational axis L. Ball bearings 126 may be configured to position between first race 122 and second race 124 to transmit the axial thrust FR from first race 122 to second race 124. In examples, ball bearings 126 are configured to position between first race 122 and second race 124 to allow first race 122 to rotate relative to second race 124 as ball bearings 126 transmit the axial thrust FR. In examples, first race 122 defines a first bearing track 128 and second race 124 defines a second bearing track 130 substantially facing first bearing track 128. Ball bearings 126 may be configured to position between first bearing track 128 and second bearing track 130. In examples, first bearing track 128 is configured to impart a force on ball bearings 126 at least in the direction of the axial thrust FR transmitted from rotor 104, and second bearing track 130 is configured to receive a force from ball bearings 126 at least in the direction of the axial thrust FR transmitted from rotor 104. Thrust bearing 112 may be configured such that first race 122 and/or second race 124 substantially surround rotational axis L, and such that ball bearings 126 substantially orbit around longitudinal axis L when rotor 104 rotates.

First race 122 may be configured such that, when rotor 104 experiences an axial thrust FR (e.g., in the direction D2), rotor 104 transmits the axial thrust FR to thrust bearing 112 to cause a force F1 on first race 122 in the direction of the axial thrust FR (e.g., in the direction D2). First race 122 may be configured to transmit the force F1 to ball bearings 126 (e.g., via first bearing track 128). Ball bearings 126 may be configured to transmit the force F1 to second race 124 (e.g., via second bearing track 130). Second race 124 is mechanically supported by structural component 116 and/or housing 106 and configured to transmit the force F1 to structural component 116 and/or housing 106, such that thrust bearing 112 transfers the axial thrust from rotor 104 to structural component 116 and/or housing 106. In response, second race 124 exerts a reaction force F2 on second race 124, such that second race 124 remains substantially stationary with respect to structural component 116 and/or housing 106. Under sufficient magnitudes of axial thrust FR from rotor 104, the force F1 and the force F2 cause ball bearings 126 to substantially maintain a tractive force with both first race 122 and second race 124 as ball bearings 126 orbit first race 122.

Magnetic apparatus 114 is configured to cause rotating machine 102 (e.g., rotor 104, structural component 116, and/or housing 106) to substantially maintain a loading of thrust bearing 112 in the direction of the force F1 caused by axial thrust FR as a magnitude of the axial thrust FR exerted by rotor 104 varies (e.g., as the loading on rotor 104 varies). Magnetic apparatus 114 may be configured to cause first race 122 to exert an axial force on ball bearings 126 in the direction of the force F1 such that ball bearings 126 maintain a tractive force with both first race 122 and second race 124 as a magnitude of the axial thrust FR varies. In examples, magnetic apparatus 114 is configured to cause first race 122 to exert the axial force on ball bearings 126 in the direction of the axial thrust FR exerted on first race 122 by rotor 104.

Hence, magnetic apparatus 114 may be configured to cause first race 122 to exert a force on ball bearings 126 in the direction of the force F1 and cause second race 124 to exert a force on ball bearings 126 in the direction of the force F2 as the axial thrust FR exerted by rotor 104 and/or any additional forces exerted on thrust bearing 112 vary over the operating conditions of rotating machine 102. Magnetic apparatus 114 may be configured such a net force on thrust bearing 112 arising from a summation of the forces caused by magnetic apparatus 114, rotor 104, and other components of rotating machine 102 acts on thrust bearing 132 in the same direction as the axial thrust FR from rotor 104 (e.g., in the direction of the force F1). Magnetic apparatus 114 may be configured to cause ball bearings 126 to substantially maintain a tractive force with both first race 122 and second race 124 as the axial thrust FR from rotor 104 varies (e.g., reduces), limiting a tendency of ball bearings 126 to centrifuge onto second race 124 as a load on rotor 104 reduces.

Magnetic apparatus 114 is configured to generate a magnetic field causing first race 122 to exert the axial force on ball bearings 126 in the direction of the force F1 caused by axial thrust FR. In examples, magnetic apparatus 114 is configured to cause the magnetic field to interact with a portion of rotating machine 102 to cause first race 122 to exert the axial force on ball bearings 126 in the direction of the force F1. Magnetic apparatus 114 may be configured such that the interaction between the magnetic field and rotating machine 102 generates a magnetic force on rotating machine 102 that causes first race 122 to exert the axial force on ball bearings 126. In examples, magnetic apparatus 114 includes a first magnetic component 134 and a second magnetic component 136, and magnetic apparatus 114 is configured to generate the magnetic field using first magnetic component 134 and/or second magnetic component 136. In some examples, both of first magnetic component 134 and second magnetic component 136 are magnets (e.g., permanent magnets or electromagnets) configured to emit a magnetic field. In some examples, one of first magnetic component 134 or second magnetic component 136 is a magnet, and the other of first magnetic component 134 or second magnetic component 136 is a material (e.g., a ferromagnetic material) configured to experience a magnetic force when the material interacts with a magnetic field. In examples, first magnetic component 134 is mechanically supported by rotating component 118 and/or rotor 104. In examples, second magnetic component 136 is mechanically supported by structural component 116 and/or housing 106.

Magnetic apparatus 114 may be configured to generate the magnetic field using first magnetic component 134 and/or second magnetic component 136 to cause a repulsion or attraction between first magnetic component 134 and second magnetic component 136. Rotating machine 102 may be configured such that the repulsion or the attraction causes first race 122 to exert an axial force on ball bearings 126 in the same direction as the force F1 caused by the axial thrust exerted by rotor 104. For example, and referring to FIG. 2, rotor 104 may be configured to exert an axial thrust on first race 122 in the direction D2 when, for example, rotor 104 causes rotating component 118 to generate an air flow in the direction D1. Magnetic apparatus 114 may be configured such that a repulsion between first magnetic component 134 and second magnetic component 136 exerts an axial force F3 on rotating component 118 in the direction D2, causing rotating component 118 to exert the axial force F3 in the direction D2 on rotor 104. Rotor 104 may be configured to transmit the force F3 to first race 122, such that first race 122 exerts an axial force on ball bearings 126 in the same direction as that produced when rotor 104 exerts the axial thrust FR on thrust bearing 112 (e.g., in the same direction of the force F1 caused by the axial thrust FR). Hence, magnetic apparatus 114 may be configured such that, as the axial thrust FR varies (e.g., with loading on rotor 104), magnetic apparatus 114 substantially maintains a loading on thrust bearing 112 in the same direction as that produced when rotor 104 exerts the axial thrust FR on thrust bearing 112. Magnetic apparatus 114 may be configured to substantially maintain the loading on thrust bearing 112 such that ball bearings 126 substantially maintain a tractive force with both first race 122 and second race 124 as the axial thrust FR varies.

In some examples, magnetic apparatus 114 may be configured such that an attractive force between first magnetic component 134 and second magnetic component 136 causes first race 122 to exert an axial force on ball bearings 126 in the same direction as the force F1 caused by the axial thrust exerted by rotor 104. For example, first magnetic component 134 may be mechanically supported on a portion of rotor 104 and/or rotating component 118 and in positional relation to second magnetic component 136 such that an attractive force between first magnetic component 134 and second magnetic component 136 causes first race 122 to exert an axial force on ball bearings 126 in the same direction as the force F1. In an example, first magnetic component 134 is positioned relative to second magnetic component 136 such that the attractive force substantially pulls rotor 104 and/or rotating component 118 in the direction of the axial thrust FR to cause first race 122 to exert the axial force on ball bearings 126 in the same direction as the force F1.

First magnetic component 134 may be configured to rotate relative to second magnetic component 136 when rotor 104 and/or rotating component 118 rotates. Second magnetic component 136 may be configured to remain rotationally stationary with respect to structural component 116 and/or housing 106 when rotor 104 and/or rotating component 118 rotates. First magnetic component 134 and/or second magnetic component may be configured to substantially maintain the repulsive or the attractive magnetic force as rotor 104 rotates around longitudinal axis L. In examples, rotating machine 102 mechanically supports first magnetic component 134 and second magnetic component 136 to maintain a clearance D1 between first magnetic component 134 and second magnetic component 136 as rotor 104 rotates. The clearance D1 defines some displacement between first magnetic component 134 and second magnetic component 136. The displacement defined may vary as the operating conditions of rotating machine 102 vary. Rotating machine 102 may be configured such that the clearance D1 is established between first magnetic component 134 and second magnetic component 136 around a periphery surrounding rotational axis L. Rotating machine 102 may be configured such that the clearance D1 is substantially maintained as rotor 104 rotates around rotational axis L. In examples, first magnetic component 134 defines a first surface and second magnetic component 136 defines a second surface substantially facing the first surface, and rotating machine 102 is configured to define the clearance D1 between the first surface and the second surface.

Magnetic apparatus 114 may be configured to generate the magnetic field (e.g., using first magnetic component 134 and/or second magnetic component 136) to act over the clearance D1 to cause the repulsive or attractive magnetic force between first magnetic component 134 and second magnetic component 136. Rotating machine 102 may be configured such that the magnetic field acts over the clearance D1 such the repulsive or attractive magnetic force between first magnetic component 134 and second magnetic component 136 causes first race 122 to exert the axial force in the direction of the force F1 on ball bearings 126. First magnetic component 134 and second magnetic component 136 may be configured to substantially maintain the clearance D1 as first magnetic component 134 rotates relative to second magnetic component 136.

In examples, at least one of first magnetic component 134 or second magnetic component 136 defines a shape including an aperture. Rotating machine 102 may be configured to mechanically support first magnetic component 134 and/or second magnetic component 136 such that the rotational axis L passes through the aperture. In examples, rotating machine 102 mechanically supports first magnetic component 134 and/or second magnetic component 136 such that rotor 104 passes through the aperture. For example, at least one of first magnetic component 134 or second magnetic component 136 may be a ring-shaped component configured to surround rotational axis L of rotating machine 102. The ring-shaped component (e.g., one of first magnetic component 134 or second magnetic component 136) may be configured to substantially maintain the clearance D1 as rotor 104 rotates. In some examples, the ring-shaped component is configured to rotate substantially synchronously with rotor 104 and/or rotating component 118. In some examples, the ring-shaped component is configured to remain substantially stationary with respect to structural component 116 and/or housing 106. In certain examples, both of first magnetic component 134 and second magnetic component 136 each define a ring-shaped component. The ring-shaped component may be configured to substantially maintain the clearance D1 as rotor 104 rotates.

Figure 3:
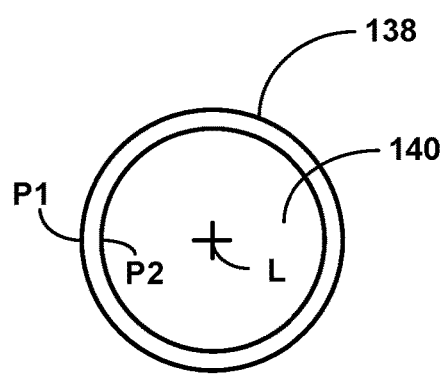
FIG. 3 is a schematic illustration of a ring shaped magnetic component.

As an example, FIG. 3 illustrates a ring-shaped component 138 defining an aperture 140. Ring-shaped component 138 includes an outer periphery P1 and an inner periphery P2 opposite outer periphery P1. Inner periphery P2 defines aperture 140. Ring-shaped component 138 may be configured such that inner periphery P2 is between outer periphery P1 when rotational axis L passes through aperture 140. Aperture 140 is configured such that rotational axis L may pass therethrough. Ring-shaped component 138 may be configured such that inner periphery P2 is between outer periphery P1 when rotational axis L passes through aperture 140. In examples, aperture 140 is configured such that rotor 104 may pass therethrough. In some examples, such as illustrated at FIG. 3, outer periphery P1 and/or inner periphery P2 may be substantially circular, although this is not required.

In examples wherein at least one of first magnetic component 134 or second magnetic component 136 define ring-shaped component 138, magnetic apparatus 114 may be configured to generate the magnetic field using ring-shaped component 138. Magnetic apparatus 114 may be configured to cause ring-shaped component 138 to emit the magnetic field to cause the attractive or repulsive force between first magnetic component 134 and second magnetic component 136, such that magnetic apparatus 114 causes first race 122 to exert an axial force on ball bearings 126 in the direction of the force F1 (FIG. 3). In some examples, magnetic apparatus 114 is configured such that ring-shaped component 138 interacts with the magnetic field emitted by magnetic apparatus 114, such that ring-shaped component 138 experiences a repulsive or attractive force in response to the interaction. For example, one of first magnetic component 134 or second magnetic component 136 may define ring-shaped component 140 and be configured to emit a magnetic field which interacts with the other of first magnetic component 134 or second magnetic component 136. One of first magnetic component 134 or second magnetic component 136 may define ring-shaped component 140 and be configured to interact with a magnetic field generated by the other of first magnetic component 134 or second magnetic component 136, such that ring-shaped component 138 experiences a repulsive or attractive force in response to the interaction. In some examples, both of first magnetic component 134 and second magnetic component 136 define a ring-shaped component such as ring-shaped component 138.

In some examples, at least one of first magnetic component 134 or second magnetic component 136 may define a magnetic component grouping arranged to define a passage substantially between individual components of the magnetic component grouping. Rotating machine 102 may be configured to mechanically support first magnetic component 134 and/or second magnetic component 136 such that the rotational axis L passes through the passage. In examples, rotating machine 102 mechanically supports first magnetic component 134 and/or second magnetic component 136 such that rotor 104 passes through the passage. For example, at least one of first magnetic component 134 or second magnetic component 136 may be a magnetic component grouping configured to surround rotational axis L of rotating machine 102. The magnetic component grouping may be configured to substantially maintain the clearance D1 as rotor 104 rotates. In examples, one of first magnetic component 134 or second magnetic component 136 is a magnetic component grouping and the other of first magnetic component 134 or second magnetic component 136 is a ring-shaped component such as ring-shaped component 138.

Figure 4:
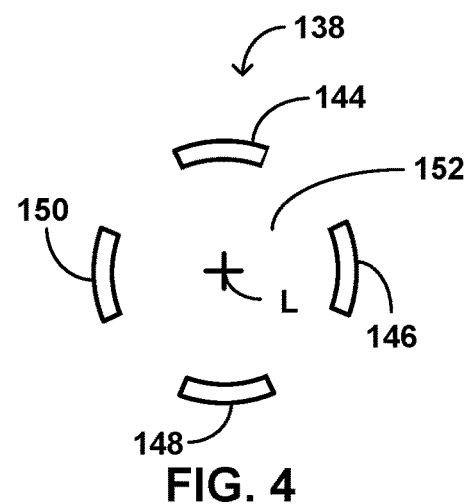
FIG. 4 is a schematic illustration of a plurality of magnetic component grouping.

As an example, FIG. 4 illustrates a magnetic component grouping 142 including a plurality of individual components such as component 144, component 146, component 148, and/or component 150 defining passage 152. Magnetic component grouping 142 defines passage 152 such that rotational axis L may pass therethrough. Magnetic component grouping 142 may be configured such that components 144, 146, 148, 140 substantially surround rotational axis L when rotational axis L passes through magnetic component grouping 142. In examples, magnetic component grouping 142 is configured such that components 144, 146, 148, 140 substantially surround rotational axis L when rotor 104 passes through passage 152. Magnetic component grouping 142 may include any number of individual components such as components 144, 146, 148, 150. In some examples, magnetic component grouping includes one or more pairs of individual components mechanically supported by rotating machine 102 such that rotational axis L passes between a first component of the pair (e.g., component 144) and a second component of the pair (e.g., component 148) when rotational axis L passes through passage 152.

In examples in which at least one of first magnetic component 134 or second magnetic component 136 define Magnetic component grouping 142, magnetic apparatus 114 may be configured to generate the magnetic field using magnetic component grouping 142. Magnetic apparatus 114 may be configured to cause magnetic component grouping 142 to emit the magnetic field to cause the attractive or repulsive force between first magnetic component 134 and second magnetic component 136, such that magnetic apparatus 114 causes first race 122 to exert an axial force on ball bearings 126 in the direction of the force F1 (FIG. 3). In some examples, magnetic apparatus 114 is configured such that magnetic component grouping 142 interacts with the magnetic field emitted by magnetic apparatus 114, such that magnetic component grouping 142 experiences a repulsive or attractive force in response to the interaction.

In some examples, one of first magnetic component 134 or second magnetic component 136 defines magnetic component grouping 142 and the other of first magnetic component 134 or second magnetic component 136 defines ring-shaped component 138, and magnetic apparatus is configured to emit a magnetic field from magnetic component grouping 142 which interacts with ring-shaped component 138 to cause a repulsive or attractive force between magnetic component grouping 142 and ring-shaped component 138. In some examples, one of first magnetic component 134 or second magnetic component 136 defines magnetic component grouping 142 and the other of first magnetic component 134 or second magnetic component 136 defines ring-shaped component 138, and magnetic component grouping 142 is configured to interact with a magnetic field generated by ring-shaped component 138 to cause a repulsive or attractive force between magnetic component grouping 142 and ring-shaped component 138.

Rotating machine 102 may be configured to support the magnetic apparatus in any manner sufficient to cause first race 122 to exert an axial force on ball bearings 126 in the same direction as the force F1 caused by axial thrust FR. Rotating machine 102 may mechanically support the first magnetic component and the second magnetic component in any manner sufficient to cause a repulsive or attractive magnetic force between the first magnetic component and the second magnetic component. Rotating machine 102 may be configured in any manner sufficient to allow one of the first magnetic component or the second magnetic component to rotate relative to the other of the first magnetic component or the second magnetic component when rotor 104 rotates.

Figure 5:
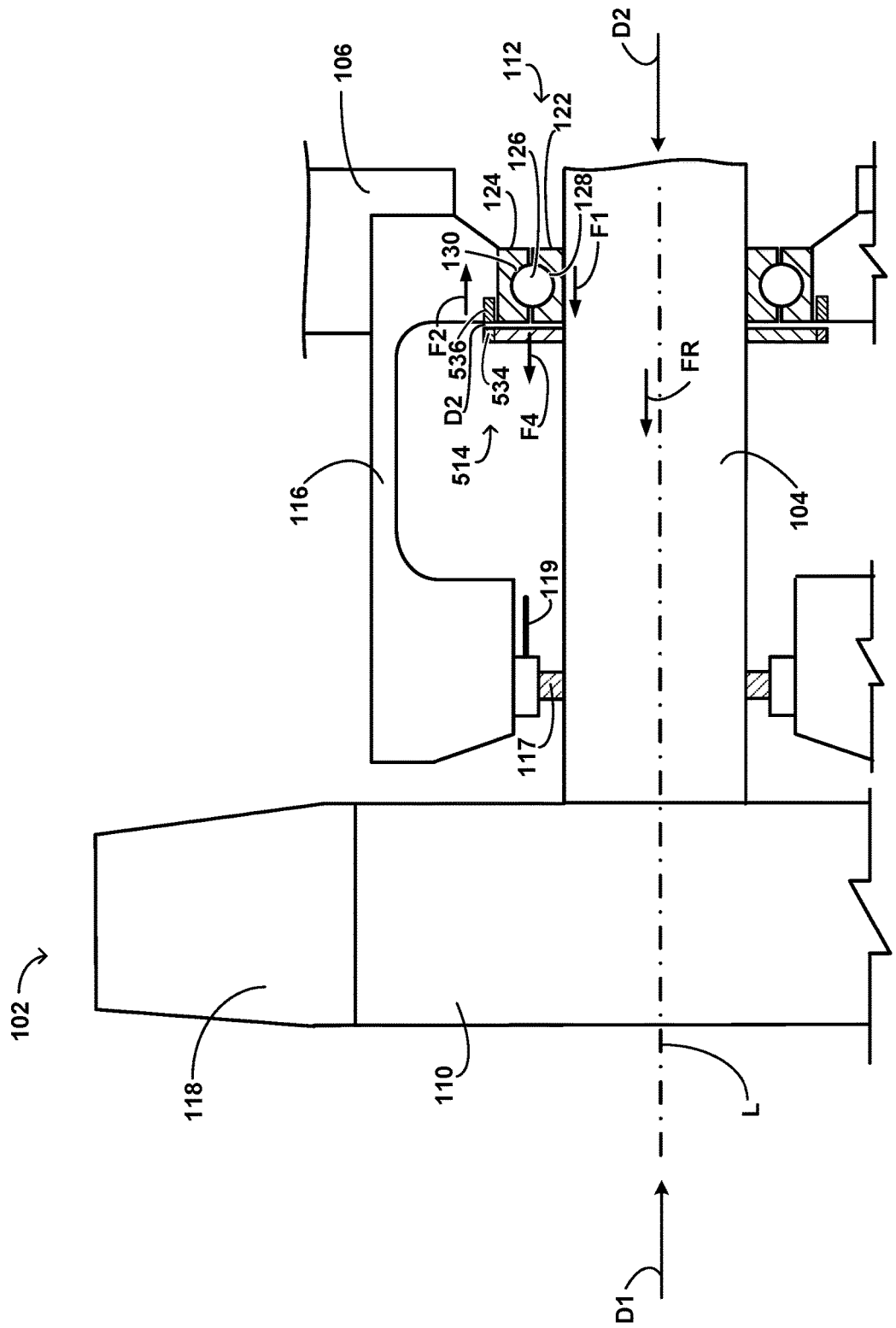
FIG. 5 is a schematic illustration of an example rotating machine with a magnetic apparatus supported by a rotor.

FIG. 5 illustrates an example rotating machine 102 including a magnetic apparatus 514 including a first magnetic component 534 and a second magnetic component 536. Magnetic apparatus 514, first magnetic component 534, and second magnetic component 536 may be examples of magnetic apparatus 114, first magnetic component 134, and second magnetic component 136 respectively. Rotating machine 102 may be configured such that first magnetic component 534 is mechanically supported by rotor 104. Second magnetic component 536 may be mechanically supported by housing 106 and/or structural component 116. Magnetic apparatus 514 is configured to generate a magnetic field using first magnetic component 534 and/or second magnetic component 536 to cause a repulsion or attraction between first magnetic component 534 and second magnetic component 536. The repulsion or attraction between first magnetic component 534 and second magnetic component 536 may cause first race 122 to exert an axial force on ball bearings 126 in the same direction as the force F1 caused by the axial thrust exerted by rotor 104.

For example, magnetic apparatus 514 may be configured such that a repulsion between first magnetic component 534 and second magnetic component 536 exerts an axial force F4 on rotor 104 in the same direction as the axial force F1 exerted on first race 122 when rotor 104 rotates around rotational axis L (e.g., in the mechanical direction of rotation). Rotor 104 may be configured to transmit the force F4 to first race 122, such that first race 122 exerts an axial force on ball bearings 126 in the same direction as that produced when rotor 104 exerts the axial thrust FR on thrust bearing 112 Magnetic apparatus 514 may be configured to cause the force F4 to substantially maintain the thrust bearing 112 loaded in the same direction as the loading caused by axial thrust FR, such that ball bearings 126 substantially maintain a tractive force with both first race 122 and second race 124 as the axial thrust FR varies.

Magnetic apparatus 514 may be configured such that an attractive force between first magnetic component 534 and second magnetic component 536 causes first race 122 to exert the force F4 on rotor 104. For example, first magnetic component 534 may be mechanically supported on a portion of rotor 104 and in positional relation to second magnetic component 536 such that an attractive force between first magnetic component 534 and second magnetic component 536 causes first race 122 to exert the force F4 on ball bearings 126. For example, first magnetic component 534 may be positioned relative to second magnetic component 536 such that the attractive force substantially pulls rotor 104 and/or rotating component 118 in the direction of the axial thrust FR to cause first race 122 to exert the force F4 on ball bearings 126.

Rotating machine 102 may be configured such that first magnetic component 534 may rotate relative to second magnetic component 536 when rotor 104 rotates. In examples, rotating machine 102 mechanically supports first magnetic component 534 and second magnetic component 536 to maintain a clearance D2 between first magnetic component 534 and second magnetic component 536 as rotor 104 rotates. The clearance D2 defines some displacement between first magnetic component 534 and second magnetic component 536. The displacement defined may vary as the operating conditions of rotating machine 102 vary. Rotating machine 102 may be configured such that the clearance D2 is established between first magnetic component 534 and second magnetic component 536 around a periphery surrounding rotational axis L. Rotating machine 102 may be configured such that the clearance D2 is substantially maintained as rotor 104 rotates around rotational axis L. In examples, first magnetic component 534 defines a first surface and second magnetic component 536 defines a second surface substantially facing the first surface, and rotating machine 102 is configured to define the clearance D2 between the first surface and the second surface.

Figure 6:
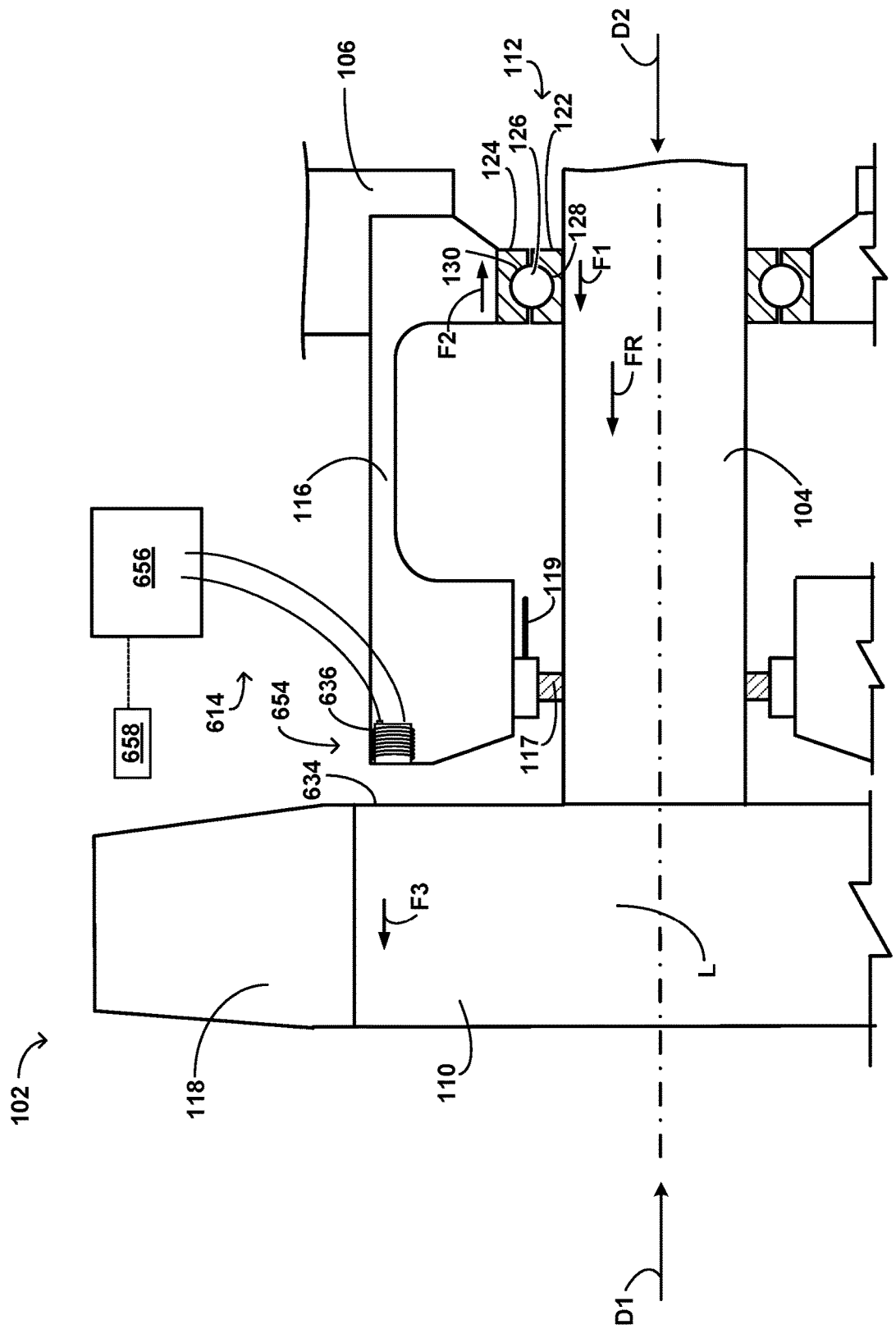
FIG. 6 is a is a schematic illustration of an example rotating machine with a magnetic apparatus including an electromagnet.

FIG. 6 illustrates a rotating machine 102 including a magnetic apparatus 614 including an electromagnet 654 configured to receive an electric current to generate a magnetic field. In examples, electromagnet 654 is configured to receive the electric current from control circuitry 656. Control circuitry 656 may be configured to generate a magnetic field having a strength based on the electric current provided by control circuitry 656. Magnetic apparatus 614 may be configured to generate the magnetic field using a first magnetic component 634 and/or a second magnetic component 636. Magnetic apparatus 614, first magnetic component 634, and second magnetic component 636 may be examples of magnetic apparatus 114, 514, first magnetic component 134, 534, and second magnetic component 136, 536 respectively.

Magnetic apparatus 614 may be configured to vary a strength of the magnetic field generated by electromagnet 654 to vary a repulsive or attractive force between first magnetic component 634 and second magnetic component 636. For example, magnetic apparatus 614 may be configured to vary a strength of the magnetic field to vary the force F3 caused by the repulsion or attraction between first magnetic component 634 and second magnetic component 636. Rotating machine 102 may be configured such that variations in the force F3 cause a variation in the axial force exerted by first race 122 on ball bearings 126 in the direction of the force F1. Hence, magnetic apparatus 614 may be configured to vary the magnetic field produced by electromagnet 654 to vary the axial force exerted by first race 122 on ball bearings 126 in the direction of the force F1.

In examples, magnetic apparatus 614 is configured to establish a strength of the magnetic field generated by electromagnet 654 based on an operating condition of rotating machine 102. Magnetic apparatus 614 may be configured to establish a strength of the magnetic field based on a parameter exhibited by rotor 104 (e.g., a speed, position, and/or loading of rotor 104). The parameter exhibited by rotor 104 may be a parameter indicative of the magnitude of axial thrust FR exerted on thrust bearing 112 by rotor 104. In examples, magnetic apparatus 614 includes a sensor 658 configured to sense the indicative parameter of rotor 104 and communicate a signal representative of the indicative parameter to control circuitry 656. Control circuitry 656 may be configured to adjust the electric current supplied to electromagnet 654 based on the signal. Magnetic apparatus 614 may be configured such that a strength of the repulsive or attractive force between first magnetic component 634 and second magnetic component 636 is dependent on the strength of the magnetic field. Hence, magnetic apparatus 614 may be configured to vary the repulsive or attractive force between first magnetic component 634 and second magnetic component 636 as the axial thrust FR exerted by rotor 104 varies. In some examples, magnetic apparatus 614 is configured to vary the magnetic field to decrease the repulsive or attractive force as the axial thrust FR of rotor 104 increases. In some examples, magnetic apparatus 614 is configured to vary the magnetic field to increase the repulsive or attractive force as the axial thrust FR of rotor 104 decreases.

In some examples, magnetic apparatus 114, 514, 614 includes an axial flux magnetic machine comprising a stator mechanically coupled to structural component 116 and/or housing 106 and a rotor mechanically coupled to rotor 104 and/or rotating component 118. In examples, the rotor includes one of first magnetic component 134, 534, 634 or second magnetic component 136, 536, 636 and the stator includes the other of first magnetic component 134, 534, 634 or second magnetic component 136, 536, 636. The axial flux magnetic machine may be configured such that, when magnetic apparatus 114, 514, 614 generates a magnetic field (e.g., using the stator or the rotor), the axial flux machine generates a repulsive or attractive force between first magnetic component 134, 534, 634 and second magnetic component 136, 536, 636 (e.g., between the stator and the rotor). In examples, the axial flux machine is configured to operate as a motor, such that a current supplied to one of the stator or the rotor causes a rotation of the other of the stator or the rotor. In examples, the axial flux machine is configured to operate as a generator, such that a rotation of the rotor relative to the stator causes generation of electrical power in the rotor or the stator. In some examples, the axial flux magnetic machine is configured as a generator, and magnetic apparatus 114, 514, 614 is configured to withdraw electrical power from the rotor or the stator when the rotor rotates relative to the stator.

Figure 7:
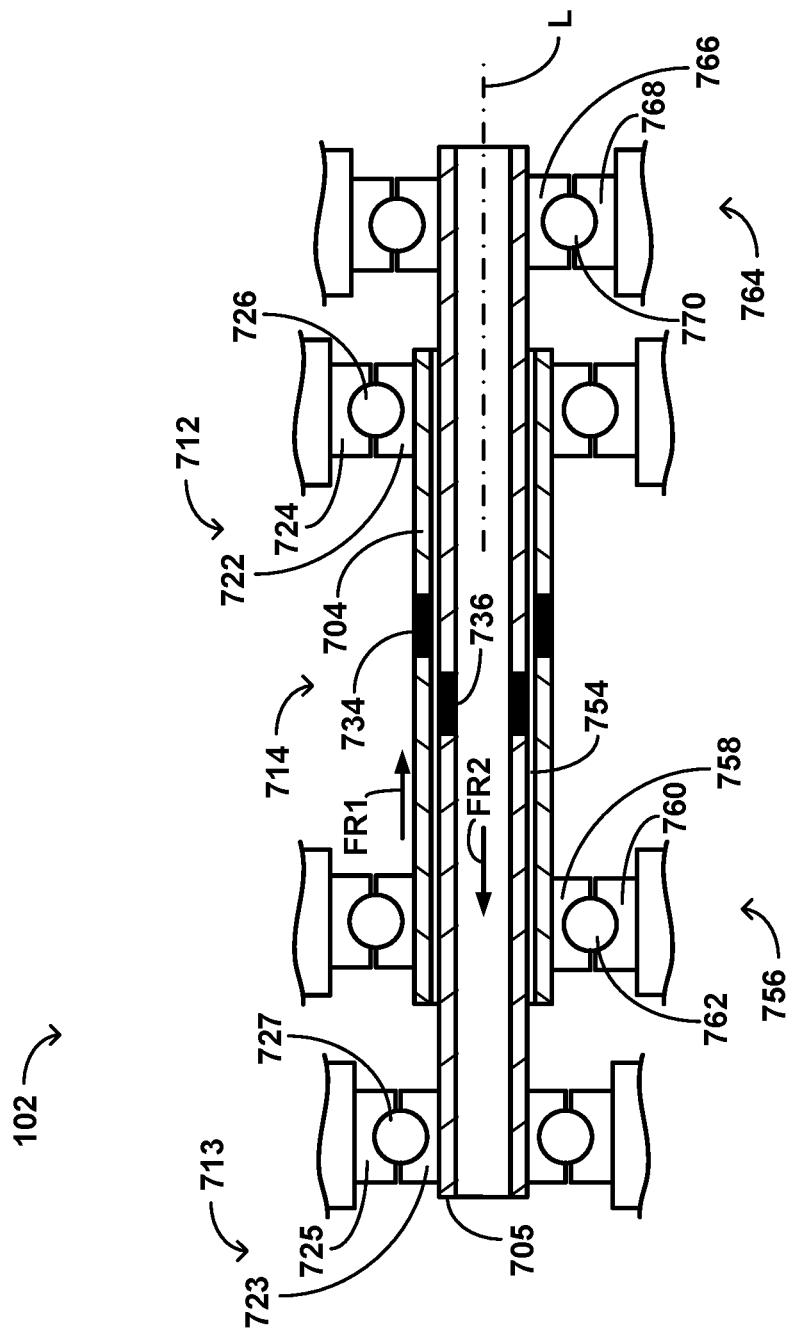
FIG. 7 is a is a schematic illustration of an example rotating machine with a magnetic apparatus supported by concentric rotors.

FIG. 7 illustrates a rotating machine 102 including a first rotor 704 configured to exert an axial thrust FR1 on thrust bearing 712 when first rotor 704 rotates around rotational axis L. First rotor 704 may be configured to transmit the axial thrust FR1 to a first race 722 of thrust bearing 712, such that first race 722 transmits the axial thrust FR1 to ball bearings 726 and ball bearings 726 transmit the axial thrust FR1 to a second race 724. As illustrated in FIG. 7, rotating machine 102 may further include a second rotor 705 configured to exert an axial thrust FR2 on second thrust bearing 713 when second rotor 705 rotates around rotational axis L. Second rotor 705 may be configured to transmit the axial thrust FR2 to a first race 723 of thrust bearing 713, such that first race 723 transmits the axial thrust FR2 to ball bearings 727 and ball bearings 727 transmit the axial thrust FR2 to a second race 725. In examples, first rotor 704 is a hollow shaft defining an interior 754, and second rotor 705 is configured to extend through interior 754, such that first rotor 704 and second rotor 705 operate as concentric rotors when first rotor 704 and second rotor 705 rotate around rotational axis L.

First rotor 704 and second rotor 705 may be examples of rotor 104. Thrust bearing 712, first race 722, ball bearings 726, and second race 724 may be examples of thrust bearing 112, first race 122, ball bearings 126, and second race 124 respectively. Thrust bearing 713, first race 723, ball bearings 727, and second race 725 may be examples of thrust bearing 112, first race 122, ball bearings 126, and second race 124 respectively. Second rotor 705 may be structural component of rotating machine 102, such that when first rotor 704 rotates relative to second rotor 705, first rotor 704 rotates relative to a structural component of rotating machine 102.

Rotating machine 102 includes a magnetic apparatus 714 including a first magnetic component 734 and a second magnetic component 736. First magnetic component 734 may be configured to rotate around rotational axis L (e.g., substantially synchronously) when first rotor 704 rotates around rotational axis L. Second magnetic component 736 may be configured to rotate around rotational axis L (e.g., substantially synchronously) when second rotor 705 rotates around rotational axis L. Magnetic apparatus 714 is configured to generate a magnetic field using at least one of first magnetic component 734 or second magnetic component 736. Magnetic apparatus 714 may be configured such that the magnetic field interacts with at least one of first magnetic component 734 or second magnetic component 736 to cause a repulsion or attraction between first magnetic component 734 and second magnetic component 736. Magnetic apparatus 714, first magnetic component 734, and second magnetic component.

Rotating machine 102 may be configured such that the repulsion or the attraction between first magnetic component 734 and second magnetic component 736 causes first race 722 to exert an axial force on ball bearings 726 in the same direction as that exerted by first race 722 when rotor 704 exerts the axial thrust FR1 on thrust bearing 712. Rotating machine 102 may be configured such that the repulsion or the attraction between first magnetic component 734 and second magnetic component 736 causes first race 723 to exert a axial force on ball bearings 727 in the same direction as that exerted by first race 723 when rotor 704 exerts the axial thrust FR2 on thrust bearing 713. In examples, rotating machine 102 is configured such that the repulsion or the attraction between first magnetic component 734 and second magnetic component 736 causes first race 722 to exert an axial force on ball bearings 726 and causes second race 724 to exert an axial force on ball bearings 727. Hence, magnetic apparatus 714 may be configured to substantially maintain a loading on thrust bearing 712 such that ball bearings 726 substantially maintain a tractive force with both first race 722 and second race 724 as the axial thrust FR1 varies, and substantially maintain a loading on thrust bearing 713 such that ball bearings 727 substantially maintain a tractive force with both first race 723 and second race 725 as the axial thrust FR2 varies.

In examples, thrust bearing 712 is a forward thrust bearing of rotor 704 and rotating machine 102 further includes an aft thrust bearing 756. Aft thrust bearing 756 may include first race 758, second race 760, and ball bearings 762. First rotor 704 may be configured to transmit the axial thrust FR1 to first race 758, such that first race 758 transmits the axial thrust FR1 to ball bearings 762 and ball bearings 762 transmit the axial thrust FR1 to second race 760. Rotating machine 102 may be configured such that the repulsion or the attraction between first magnetic component 734 and second magnetic component 736 causes first race 758 to exert an axial force on ball bearings 762 in the same direction as that exerted by first race 758 when rotor 704 exerts the axial thrust FR1 on aft thrust bearing 756. In some examples, thrust bearing 713 is an aft thrust bearing of rotor 704 and rotating machine 102 further includes a forward thrust bearing 764. Forward thrust bearing 764 may include first race 766, second race 768, and ball bearings 770. Second rotor 705 may be configured to transmit the axial thrust FR2 to first race 766, such that first race 766 transmits the axial thrust FR2 to ball bearings 770 and ball bearings 770 transmit the axial thrust FR2 to second race 768. Rotating machine 102 may be configured such that the repulsion or the attraction between first magnetic component 734 and second magnetic component 736 causes first race 766 to exert an axial force on ball bearings 770 in the same direction as that exerted by first race 766 when rotor 705 exerts the axial thrust FR2 on forward thrust bearing 764.

First race 122, 722, 723, 758, 766 may be configured to receive the axial thrust FR, FR1, FR2 from rotor 104, 704, 705 while rotating substantially synchronously with the rotor 104, 704, 705. In examples, first race 122, 722, 723, 758, 766 is a lower race substantially surrounding rotational axis L of the rotor and configured to rotate synchronously with rotor 104 around rotational axis L. In examples, first race 122, 722, 723, 758, 766 is affixed to rotor 104 such that rotor 104 causes the rotation of first race 122, 722, 723, 758, 766. First race 122, 722, 723, 758, 766 may extend over some portion of or substantially all of a circumference defined by rotor 104. Second race 124, 724, 725, 760, 768 may be an upper race configured to remain substantially stationary with respect to structural component 116 and/or housing 106 of rotating machine 102. Thus, second race 124, 724, 725, 760, 768 may be configured such that rotation of rotor 104, 704, 705 causes first race 122, 722, 723, 758, 766 to rotate relative to second race 124, 724, 725, 760, 768. In examples, first race 122, 722, 723, 758, 766 is configured such that first bearing track 128 substantially surrounds rotational axis L defined by rotor 104, 704, 705. Second race 124, 724, 725, 760, 768 may be configured such that second bearing track 130 substantially surrounds rotational axis L defined by rotor 104, 704, 705. Thrust bearing 112 may be configured such that ball bearings 126, 726, 727, 762, 770 substantially surround rotational axis L when ball bearings 126, 726, 727, 762, 770 are positioned between first bearing track 128 and second bearing track 130.

In examples, rotor 104, 704, 705 mechanically supports rotating component 118 (FIGS. 2, 5, 6) configured to cause the axial thrust FR on rotor 104, 704, 705 when rotor 104, 704, 705 rotates. Rotating component 118 may be configured to rotate (e.g., rotate synchronously) when rotor 104, 704, 705 rotates. In examples, rotating component 118 is configured to generate a component force FC (e.g., in the direction D2) when rotating component 118 rotates. Rotating component 118 may be configured to transmit the component force FC to rotor 104, 704, 705 when rotating component 118 rotates. Hence, rotating component 118 may be configured to transmit a component force FC to rotor 104, 704, 705 as rotating component 118 and rotor 104, 704, 705 rotate (e.g., rotate synchronously), such that rotor 104, 704, 705 experiences an axial thrust FR when rotor 104, 704, 705 rotates around rotational axis L. In examples, rotating component 118 is configured to generate the component force FC substantially parallel to an axis of rotation of rotating component 118 when rotating component 118 rotates around the axis of rotation.

In examples, rotor 104, 704, 705 is configured to cause the rotation of rotating component 118 when rotor 104, 704, 705 rotates around rotational axis L. For example, rotating component 118 may be a fan including fan impellor 110. Rotor 104, 704, 705 is configured to cause a rotation of fan impellor 110 around rotational axis L (e.g., a synchronous rotation) when rotor 104, 704, 705 rotates around rotational axis L. Fan impellor 110 may be configured to generate an intake air flow in the direction D1 when rotor 104, 704, 705 causes the rotation of fan impellor 110, such that fan impellor 110 generates a component force FC in the direction D2. Fan impellor 110 may be configured to transmit the component force FC to rotor 104, 704, 705, such that rotor 104, 704, 705 experiences the axial thrust FR in the direction D2 when rotor 104, 704, 705 rotates.

Rotating component 118 may be any rotating component configured to generate a component force FC and transmit the component force FC to rotor 104, 704, 705 when rotating component 118 rotates. In some examples, rotor 104, 704, 705 is configured to cause the rotation of rotating component 118. In other examples, rotating component 118 is configured to cause the rotation of rotor 104, 704, 705 (e.g., when rotor 104 is a turbine rotor). Further, rotating component 118 may be configured to generate a component force FC in any manner when rotating component 118 rotates. In some examples, rotating component 118 is configured to transfer momentum to a fluid such as air using, for example, fan impellor 110, and the transfer of momentum to the fluid causes rotating component 118 to generate the component force FC. In some examples, rotating component 118 is configured to receive momentum from a fluid such as a pressurized gas using, for example, a plurality of turbine blades, and the transfer of momentum from the fluid causes rotating component 118 to generate the component force FC.

Control circuitry 656, sensor 658, and/or a magnetic apparatus such as magnetic apparatus 114, 514, 614 may include any suitable arrangement of hardware, software, firmware, or any combination thereof, to perform the techniques attributed to control circuitry 656, sensor 658, and/or a magnetic apparatus such as magnetic apparatus 114, 514, 614 herein. Examples of control circuitry 656, sensor 658, and/or a magnetic apparatus such as magnetic apparatus 114, 514, 614 include any one or more microprocessors, digital signal processors (DSPs), application specific integrated circuits (ASICs), field programmable gate arrays (FPGAs), or any other equivalent integrated or discrete logic circuitry, as well as any combinations of such components. When control circuitry 656, sensor 658, and/or a magnetic apparatus such as magnetic apparatus 114, 514, 614 includes software or firmware, control circuitry 656, sensor 658, and/or a magnetic apparatus such as magnetic apparatus 114, 514, 614 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

Control circuitry 656, sensor 658, and/or a magnetic apparatus such as magnetic apparatus 114, 514, 614 may include and/or be operably coupled to a memory. The memory may include any volatile or non-volatile media, such as a random access memory (RAM), read only memory (ROM), non-volatile RAM (NVRAM), electrically erasable programmable ROM (EEPROM), flash memory, and the like. In addition, in some examples, the memory or another memory may also store executable instructions for causing control circuitry 656, sensor 658, and/or a magnetic apparatus such as magnetic apparatus 114, 514, 614 described herein to perform the actions attributed to it.

Figure 8:
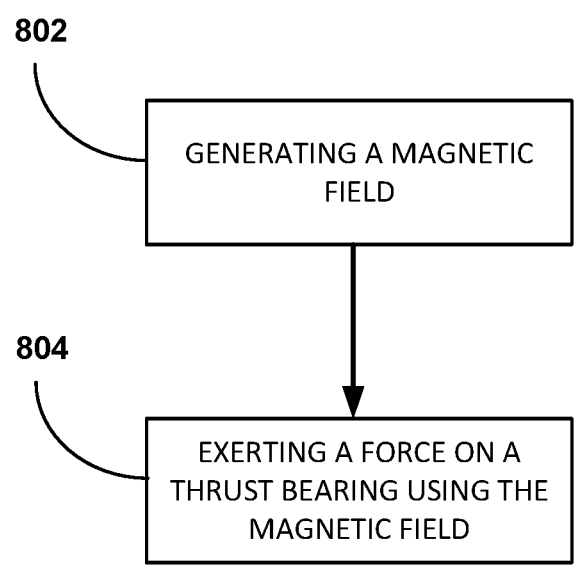
FIG. 8 is a flow diagram illustrating an example method of exerting an axial force on a thrust bearing.

A technique generating an axial force on a thrust bearing 112, 712, 713, 756, 764 using a magnetic apparatus 114, 514, 614 is illustrated in FIG. 8. Although the technique is described mainly with reference to rotating machine 102 of FIGS. 1-7, the technique may be applied to other rotating machines in other examples.

The technique includes generating a magnetic field using magnetic apparatus 114, 514, 614 of rotating machine 102 (802). Rotating machine 102 includes rotor 104, 704, 705 configured to rotate around rotational axis L relative to structural component 116 and/or housing 106 of rotating machine 102. Rotor 104, 704, 705 may exert an axial thrust FR, FR1, FR2 on thrust bearing 112, 712, 713, 756, 764 when rotor 104, 704, 705 rotates around rotational axis L. In examples, rotor 104, 74, 705 exerts the axial thrust FR, FR1, FR2 when rotor 104, 704, 705 rotates around rotational axis L in a mechanical direction of rotation supporting an operation of rotating machine 102. In examples, rotor 104, 704, 705 exerts the axial thrust FR, FR1, FR2 on first race 122, 722, 723, 758, 766, first race 122, 722, 723, 758, 766 transmits axial thrust FR, FR1, FR2 to ball bearings 126, 726, 727, 762, 770, and ball bearings 126, 726, 727, 762, 770 transmit axial force FR, FR1, FR2 to second race 124, 724, 725, 760, 768. In examples, rotor 104, 704, 705 mechanically supports rotating component 118, and rotating component 118 is configured to exert axial thrust FR, FR1, FR2 on rotor 104, 704, 705.

Magnetic apparatus 114, 514, 614 may generate the magnetic field using at least one of first magnetic component 134, 534, 634 or second magnetic component 136, 536, 636. In examples, magnetic apparatus 114, 514, 614 generates the magnetic field using first magnetic component 134, 534, 634 and second magnetic component 136, 536, 636. In some examples, first magnetic component 134, 534, 634 and/or second magnetic component 136, 536, 636 include a permanent magnet configured to emit the magnetic field. In some examples, first magnetic component 134, 534, 634 and/or second magnetic component 136, 536, 636 include an electromagnet configured to emit the magnetic field.

The technique includes using the magnetic field to exert a force on thrust bearing 112, 712, 713, 756, 764 in the direction of the axial thrust FR, FR1, FR2 exerted on thrust bearing 112, 712, 713, 756, 764 by rotor 104, 704, 705 (804). The technique may include using the magnetic field to cause first race 122, 722, 723, 758, 766 to exert an axial force on ball bearings 126, 726, 727, 762, 770 in the same direction as a force exerted by first race 122, 722, 723, 758, 766 on ball bearings 126, 726, 727, 762, 770 when rotor 104, 704, 705 exerts axial thrust FR, FR1, FR2 on thrust bearing 112, 712, 713, 756, 764. In examples, the technique includes generating a magnetic force on at least one of first magnetic component 134, 534, 634 or second magnetic component 136, 536, 636 using the magnetic field. The magnetic force may cause an attraction or repulsion between first magnetic component 134, 534, 634 and second magnetic component 136, 536, 636. In examples, the attraction or repulsion causes first race 122, 722, 723, 758, 766 to exert an axial force on ball bearings 126, 726, 727, 762, 770 in the same direction as a force exerted by first race 122, 722, 723, 758, 766 on ball bearings 126, 726, 727, 762, 770 when rotor 104, 704, 705 exerts axial thrust FR, FR1, FR2 on thrust bearing 112, 712, 713, 756, 764.

In examples, the technique includes causing a rotation of rotor 104, 704, 705 relative to structural component 116 and/or housing 106 of rotating machine 102. The rotation of rotor 104, 704, 705 may cause a rotation of one of first magnetic component 134, 534, 634 or second magnetic component 136, 536, 636 relative to the other of first magnetic component 134, 534, 634 or second magnetic component 136, 536, 636. In examples, one of first magnetic component 134, 534, 634 or second magnetic component 136, 536, 636 is substantially stationary when rotor 104, 704, 705 causes a rotation of the other of first magnetic component 134, 534, 634 or second magnetic component 136, 536, 636. In some examples, at least one of first magnetic component 134, 534, 634 or second magnetic component 136, 536, 636 defines ring-shaped component 138 surrounding rotational axis L. In some examples, at least one of first magnetic component 134, 534, 634 or second magnetic component 136, 536, 636 defines magnetic component grouping 142 surrounding rotational axis L.

In examples, at least one of first magnetic component 134, 534, 634 or second magnetic component 136, 536, 636 includes an electromagnet 654 configured to generate the magnetic field. Electromagnet 654 may receive an electric current from control circuitry 656 to generate the magnetic field. In examples, control circuitry 656 varies the electric current to cause electromagnet 654 to vary a strength of the magnetic field. Rotating machine 102 may vary an axial force exerted by first race 122, 722, 723, 758, 766 to exert an axial force on ball bearings 126, 726, 727, 762, 770 as electromagnet 654 varies the strength of the magnetic field. In examples, sensor 658 provide a signal to control circuitry 656 indicative of a parameter of rotor 104, 704, 705, and control circuitry 656 provides the electric current to electromagnet 654 based on the signal indicative of the parameter.

In some examples, magnetic apparatus 114, 514, 614 includes an axial flux magnetic machine including first magnetic component 134, 534, 634 and second magnetic component 136, 536, 636. Magnetic apparatus 114, 514, 614 may generate the magnetic field using the axial flux magnetic machine. The axial flux machine may generate a repulsive or attractive force between first magnetic component 134, 534, 634 and second magnetic component 136, 536, 636 when magnetic apparatus 114, 514, 614 generates the magnetic field. In examples, the axial flux machine generates the repulsive of attractive force when axial force machine operates as a motor. In examples, the axial flux machine generates the repulsive of attractive force when axial force machine operates as a generator. In examples, magnetic apparatus 114, 514, 614 withdraws electrical power from the axial flux magnetic machine when one of first magnetic component 134, 534, 634 or second magnetic component 136, 536, 636 rotor rotates relative to the other of first magnetic component 134, 534, 634 or second magnetic component 136, 536, 636.

The technique may include causing first rotor 704 to exert an axial thrust FR1 on thrust bearing 712 when first rotor 704 rotates around rotational axis L. First rotor 704 may transmit the axial thrust FR1 to first race 722 of thrust bearing 712. The technique may include causing second rotor 705 to exert an axial thrust FR2 on second thrust bearing 713 when second rotor 705 rotates around rotational axis L. Second rotor 705 may transmit the axial thrust FR2 to first race 723 of thrust bearing 713. In examples, second rotor 705 extends within interior 754 of first rotor 704. Magnetic apparatus 714 generate a magnetic field using at least one of first magnetic component 734 or second magnetic component 736 to cause a repulsion or attraction between first magnetic component 734 and second magnetic component 736. Rotating machine 102 may cause first race 722 to exert an axial force on ball bearings 726 and/or cause first race 723 to exert a axial force on ball bearings 727 when magnetic apparatus 714 generates the magnetic field. In examples, rotating machine 102 causes first race 758 to exert an axial force on ball bearings 762 and/or causes first race 766 to exert an axial force on ball bearings 770 when magnetic apparatus 714 generates the magnetic field.

The techniques described in this disclosure, including those attributed to control control circuitry 656, sensor 658, and/or a magnetic apparatus such as magnetic apparatus 114, 514, 614 and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components, and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The present disclosure includes the following examples.

Example 1: A rotating machine comprising: a rotor configured to rotate relative to a structural component of the rotating machine; a thrust bearing comprising a first race, a second race, and a plurality of ball bearings, wherein: the first race is configured to receive an axial thrust from the rotor when the rotor rotates relative to the structural component, and the plurality of ball bearings are configured to transfer the axial thrust to the second race; and a magnetic component affixed to the rotating machine, wherein the magnetic component is configured to generate a magnetic field causing the first race to exert an axial force on the ball bearings in the direction of the axial thrust.

Example 2: The rotating machine of example 1, wherein the magnetic component is configured to cause the magnetic field to exert a magnetic force on the structural component, and wherein the structural component is configured to transmit a portion of the magnetic force to cause the first race to exert the axial force on the ball bearings.

Example 3: The rotating machine of example 2, wherein the magnetic component is configured to cause the magnetic field to repel the structural component to cause the first race to exert the axial force on the ball bearings.

Example 4: The rotating machine of example 2 or example 3, wherein the magnetic component is configured cause the magnetic field to attract the structural component to cause the first race to exert the axial force on the ball bearings.

Example 5: The rotating machine of any of examples 1-4, claim 2, wherein: the rotor is configured to rotate around a rotational axis when the rotor rotates relative to the structural component, and at least one of the magnetic component or the structural component defines a ring surrounding the rotational axis.

Example 6: The rotating machine of any of examples 1-5, wherein the magnetic component is configured to generate a magnetic field exerting the axial force on the rotor to cause the first race to exert the axial force on the ball bearings.

Example 7: The rotating machine of any of examples 1-6, wherein the first race is configured to rotate synchronously with the rotor.

Example 8: The rotating machine of any of examples 1-7, wherein the second race is configured to transfer the axial thrust to the structural component.

Example 9: The rotating machine of any of examples 1-8, wherein: the rotor is a first rotor and the first race is configured to receive the axial thrust from the first rotor, the structural component is a second rotor concentric with the first rotor, and the magnetic component is affixed to the second rotor and configured to cause the magnetic field to exert a magnetic force on the first rotor to cause the first race to exert the axial force on the ball bearings.

Example 10: The rotating machine of any of examples 1-9, wherein the rotor is configured to rotate around a rotational axis, and wherein the magnetic component is configured to generate the magnetic field to cause the first race to exert the axial force on the ball bearings independent from a rotational position of the rotor around the rotational axis.

Example 11: The rotating machine of any of examples 1-10, wherein the magnetic component is configured to generate the magnetic field to cause the rotor to exert the axial force on the first race to cause the first race to exert the axial force on the ball bearings.

Example 12: The rotating machine of any of examples 1-11, wherein: the direction of the axial thrust is a first direction, the magnetic component is configured to generate the magnetic field to cause an magnetic force on the second race in a second direction opposite the first direction, the ball bearings are configured to transfer the magnetic force in the second direction to the first race, and the first race is configured to exert a reaction force in the first direction on the ball bearings in response to the magnetic force in the second direction, such that the first race exerts the axial force on the ball bearings in the direction of the axial thrust.

Example 13: The rotating machine of any of examples 1-12, wherein the magnetic component is one of a permanent magnet or an electromagnet.

Example 14: The rotating machine of any of examples 1-13, wherein the magnetic component is a first magnetic component and the first magnetic component is configured to cause the magnetic field to exert a magnetic force on a second magnetic component to cause the first race to exert the axial force on the ball bearings.

Example 15: The rotating machine of example 14, wherein the magnetic component is an electromagnet, and further comprising control circuitry configured to control a strength of the magnetic field based on an operating condition of the rotor, wherein a magnitude of the axial force on the ball bearings is dependent on the strength of the magnetic field.

Example 16: A rotating machine comprising: a rotor configured to rotate relative to a structural component of the rotating machine; a thrust bearing comprising a first race configured to rotate synchronously with the rotor, a second race, and a plurality of ball bearings, wherein: the first race is configured to receive an axial thrust from the rotor when the rotor rotates relative to the structural component, and the plurality of ball bearings are configured to transfer the axial thrust to the second race; and a magnetic component affixed to the rotating machine, wherein: the magnetic component is configured to generate a magnetic field to exert a mechanical force on the structural component, and the structural component is configured to transmit a portion of the mechanical force to cause the first race to exert an axial force on the ball bearings in the direction of the axial thrust.

Example 17: The rotating machine of examples 16, wherein: the rotor is configured to rotate around a rotational axis when the rotor rotates relative to the structural component, and at least one of the magnetic component or the structural component defines a ring surrounding the rotational axis.

Example 18: The rotating machine of example 16 or example 17, wherein the rotor is configured to rotate around a rotational axis, and wherein the magnetic component is configured to generate the magnetic field to cause the first race to exert the axial force on the ball bearings independent from a rotational position of the rotor around the rotational axis.

Example 19: A method comprising: generating a magnetic field using a magnetic component affixed to a rotating machine having a thrust bearing comprising to a first race, a second race, and a plurality of ball bearings between the first race and the second race, wherein, when the rotor rotates relative to a structural component of the rotating machine, the rotor exerts an axial thrust on the first race and the plurality of ball bearings transfer the axial thrust to the second race; and causing, using the magnetic field, the first race to exert an axial force on the ball bearings in the direction of an axial thrust.

Example 20: The method of example 19, further comprising exerting a magnetic force on the structural component using the magnetic field; and transmitting the magnetic force from the structural component to the thrust bearing to cause the first race to exert the axial force on the ball bearings.

Various examples have been described. These and other examples are within the scope of the following claims.

What is claimed is:

1. A rotating machine comprising:
a first rotor configured to rotate relative to a second rotor concentric with the first rotor;
a thrust bearing comprising a first race, a second race, and a plurality of ball bearings, wherein:
the first race is configured to receive an axial thrust from the first rotor when the first rotor rotates relative to a structural component of the rotating machine, and
the plurality of ball bearings are configured to transfer the axial thrust to the second race; and
a magnetic component affixed to at least one of the first rotor or the second rotor, wherein the magnetic component is configured to cause a magnetic force between the first rotor and the second rotor to cause the first race to exert an axial force on the ball bearings in the direction of the axial thrust.

2. The rotating machine of claim 1, wherein the magnetic component is configured to cause the magnetic field to exert a magnetic force on the first rotor, and wherein the first rotor is configured to transmit a portion of the magnetic force to cause the first race to exert the axial force on the ball bearings.

3. The rotating machine of claim 2, wherein the magnetic component is configured to cause the magnetic field to repel the first rotor to cause the first race to exert the axial force on the ball bearings.

4. The rotating machine of claim 2, wherein the magnetic component is configured to cause the magnetic field to attract the first rotor to cause the first race to exert the axial force on the ball bearings.

5. The rotating machine of claim 1, wherein:
the first rotor is configured to rotate around a rotational axis when the first rotor rotates relative to the second rotor, and
at least one of the magnetic component, the first rotor, or the second rotor defines a ring surrounding the rotational axis.

6. The rotating machine of claim 1, wherein the magnetic component is configured to generate a magnetic field exerting the axial force on the first rotor to cause the first race to exert the axial force on the ball bearings.

7. The rotating machine of claim 1, wherein the first race is configured to rotate synchronously with the first rotor.

8. The rotating machine of claim 1, wherein the first rotor is configured to rotate relative to the structural component of the rotating machine, and wherein the second race is configured to transfer the axial thrust to the structural component.

9. The rotating machine of claim 1, wherein
the magnetic component is affixed to the second rotor and configured to cause the magnetic field to exert a magnetic force on the first rotor to cause the first race to exert the axial force on the ball bearings.

10. The rotating machine of claim 1, wherein the first rotor is configured to rotate around a rotational axis, and wherein the magnetic component is configured to generate the magnetic field to cause the first race to exert the axial force on the ball bearings independent from a rotational position of the first rotor around the rotational axis.

11. The rotating machine of claim 1, wherein the magnetic component is configured to generate the magnetic field to cause the first rotor to exert the axial force on the first race to cause the first race to exert the axial force on the ball bearings.

12. The rotating machine of claim 1, wherein:
the direction of the axial thrust is a first direction,
the second race is configured to exert a reaction force in a second direction opposite the first direction on the ball bearings in response to the magnetic force.

13. The rotating machine of claim 1, wherein the magnetic component is one of a permanent magnet or a component configured to receive an electric current to generate a magnetic field, wherein the magnetic field is configured cause the magnetic force.

14. The rotating machine of claim 1 wherein the magnetic component is a first magnetic component and the first magnetic component is configured to cause the magnetic field to exert a magnetic force on a second magnetic component to cause the first race to exert the axial force on the ball bearings.

15. The rotating machine of claim 14, wherein the magnetic component is configured to receive an electric current to generate a magnetic field, and further comprising control circuitry configured control the electric current to control a strength of the magnetic field based on an operating condition of the rotor, wherein a magnitude of the axial force on the ball bearings is dependent on the strength of the magnetic field.

16. A rotating machine comprising:
a first rotor configured to rotate relative to a second rotor concentric with the first rotor;
a thrust bearing comprising a first race configured to rotate synchronously with the first rotor, a second race, and a plurality of ball bearings, wherein:
the first race is configured to receive an axial thrust from the first rotor when the rotor rotates relative to a structural component of the rotating machine, and the plurality of ball bearings are configured to transfer the axial thrust to the second race; and a magnetic component affixed to the second rotor, wherein:

the magnetic component is configured to generate a magnetic field to exert a magnetic force on the first rotor to cause the first race to exert an axial force on the ball bearings in the direction of the axial thrust, and the second race is configured to transfer the axial thrust to the structural component.

17. The rotating machine of claim 16, wherein:

the first rotor is configured to rotate around a rotational axis when the first rotor rotates relative to the structural component, and at least one of the magnetic component or the structural component defines a ring surrounding the rotational axis.

18. The rotating machine of claim 16, wherein the first rotor is configured to rotate around a rotational axis, and wherein the magnetic component is configured to generate the magnetic field to cause the first race to exert the axial force on the ball bearings independent from a rotational position of the first rotor around the rotational axis.

19. A method comprising:

generating a magnetic field using a magnetic component affixed to at least one of a first rotor of a rotating machine or a second rotor concentric with the first rotor, the rotating machine having a thrust bearing comprising a first race, a second race, and a plurality of ball bearings between the first race and the second race, wherein, when the first rotor rotates relative to a structural component of the rotating machine, the first rotor exerts an axial thrust on the first race and the plurality of ball bearings transfer the axial thrust to the second race; and causing, using the magnetic field, a magnetic force between the first rotor and the second rotor to cause the first race to exert an axial force on the ball bearings in the direction of an axial thrust.

20. The method of claim 19, further comprising transmitting the axial force from the second race to the structural component.

* * * * *

UNITED STATES PATENT AND TRADEMARK OFFICE
CERTIFICATE OF CORRECTION

| | | |
|---|---|---|
| PATENT NO. | : 11,835,088 B2 | Page 1 of 1 |
| APPLICATION NO. | : 17/303435 | |
| DATED | : December 5, 2023 | |
| INVENTOR(S) | : Timothy Unton and Sean Andrew Morgan | |

It is certified that error appears in the above-identified patent and that said Letters Patent is hereby corrected as shown below:

In the Claims

Column 26, Lines 35-36 (Claim 12): Replace "the direction of the axial thrust is a first direction, the second race" with -- the direction of the axial thrust is a first direction, and the second race --

Signed and Sealed this
Twenty-fifth Day of February, 2025

Coke Morgan Stewart
*Acting Director of the United States Patent and Trademark Office*